United States Patent [19]

Bock

[11] Patent Number: 5,719,707
[45] Date of Patent: Feb. 17, 1998

[54] METALLIC OXIDE/HALOGEN COATED CUBICLE DISPLAY DEVICE

[76] Inventor: Steven Bock, 6019 Berkshire Suite 200, Dallas, Tex. 75225-5606

[21] Appl. No.: 594,531

[22] Filed: Jan. 31, 1996

[51] Int. Cl.⁶ ............................................. G02B 27/14
[52] U.S. Cl. .................................... 359/630; 359/635
[58] Field of Search .............................. 359/630, 635, 359/634

[56] References Cited

U.S. PATENT DOCUMENTS

| | | | |
|---|---|---|---|
| 1,418,033 | 5/1922 | Sutcliffe | 359/630 |
| 2,121,255 | 6/1938 | Miller | 359/635 |

OTHER PUBLICATIONS

"The Photonics Design & Applications Handbook" article entitled What a Designer Should Look for When Choosing a Beamsplitter; Book 3; 1995; pp. 4–7.

Primary Examiner—David C. Nelms
Assistant Examiner—Thomas Robbins
Attorney, Agent, or Firm—Beirne, Maynard & Parsons, L.L.P.

[57] ABSTRACT

A metallic oxide or halogen coated displaying cubicle is formed from two triangular-shaped portions forming a square cube such that a first imprinted, etched or otherwise permanently secured on the like image, such as a company logo, is positioned on one of the six faces is projected through another of the faces so that one may view one or both of the images separately or in combination with one another.

19 Claims, 2 Drawing Sheets

FIG.7
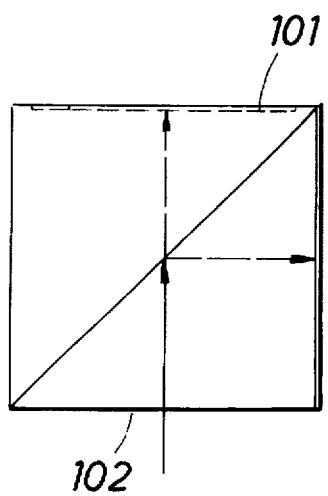
FIG.8
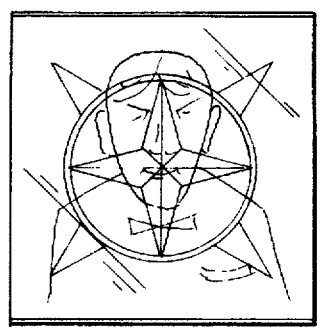
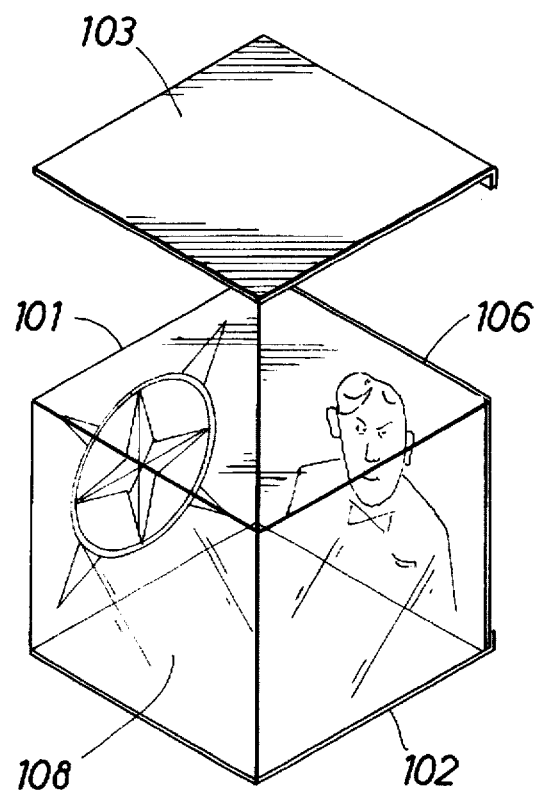
FIG.9

METALLIC OXIDE/HALOGEN COATED CUBICLE DISPLAY DEVICE

BACKGROUND OF THE INVENTION

1. Field of the Invention

The invention is directed to a display device for fixed or moving images therethrough.

2. Background of the Invention

Cubic, clear paperweights, or the like, made from optically acceptable crystal, glass or plexiglass, are well known to those skilled in the art of display devices. Such prior art devices often times have had affixed thereon one or more 90 degree offset pictures, emblems or symbols of one or more individuals, business logos, family coat of arms, photographs, and the like.

The present invention is directed to providing a different type of display device by permitting one or two images on separate sides or faces of the device to be viewed through the device either separately or in combination with one another. The display device does not necessarily have to be a paperweight, or the like, but has considerable other industry applications. The display device may be used for presentation of an emblem or logo, together with a photograph, printed statement, motion picture projection, television projection, and the like, into and through the device. In an enlarged variant of the device, either alone or in combination with an optical-enlarging device, the display device of the present invention could be used to project a plurality of motion pictures into separate viewing areas in an airplane, display hall, concert or other auditorium or displaying area, which, in turn, could reduce display costs or reduce space and facilities otherwise required for projection of images in multi-directions.

SUMMARY OF THE INVENTION

A metallic oxide or halogen coated cubicle display device is provided which comprises a cube with six exterior faces. The cube is formed from a pair of equal triangularly-shaped portions of initially optically transparent material, such as glass, plexiglass or crystal. Each of the triangularly-shaped portions have first and second sides which are of equal length, together with the third side which is longer than either of the first and second sides. The portions have emplaced across their exterior a film, which is applied by brush, spray, or other known means, of a metallic oxide or halogen sufficient to transpose each of the third sides into an optically deflecting surface. The first and second of the six surfaces are offset from a line which intersects the third side of the triangularly-shaped portions at approximately 90 degrees, such that images which are projected onto the exterior of one of the first and second sides is projected through the other of the first and second sides. Each of the third and fourth faces are optically distorted, or covered, to prevent any image projected onto the exterior of the third and fourth faces from being non-distortedly projected through the other of the third and fourth faces. One of the fifth and sixth faces have an image which is projected on it which may also be projected through the other of the fifth and sixth faces. The other of the fifth and sixth faces project an image therethrough which may be projected through the other of the fifth and sixth faces, as well as through one of the first and second faces.

BRIEF DESCRIPTION OF THE DRAWINGS

FIG. 7 is a view of the device looking through side two.

FIG. 8 is a cross-sectional view of the device with images onto sides five 105 and one 101 combined when received through side two 102.

FIG. 9 is a view similar to that of FIG. 2, but looking through sides two 102 or six 106 with images on side 5 105 and/or side 1 101.

DESCRIPTION OF THE PREFERRED EMBODIMENTS

Figure 1:
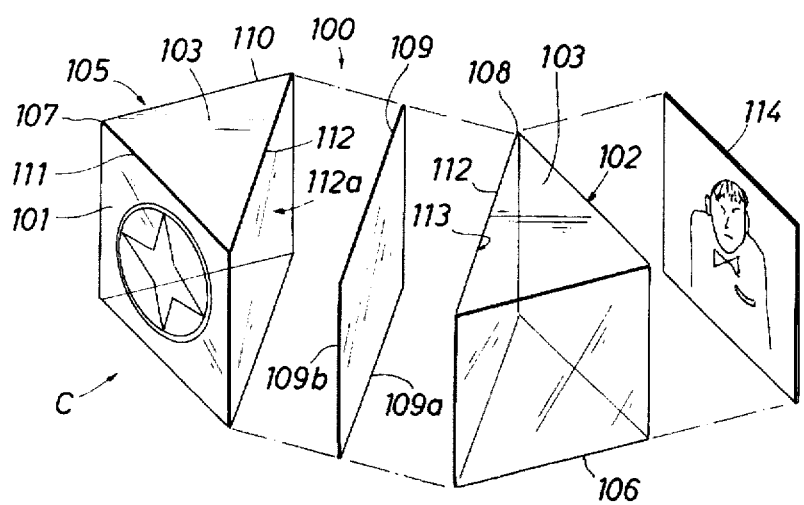
FIG. 1 is a horizontally sectionalized view showing each of the triangularly-shaped portions and the metallic oxide/halogen film, together with a fixed image on one face and a framed image on another face.

Now, with reference to FIG. 1, there is shown the display device 100 of the present invention. The device 100 has a first face, 101, a second face, 102, 180 degrees opposite of the first face, 101, a third face, 103, provided by the merger of triangularly-shaped portion 108 and triangularly-shaped portion 107. The fifth face, 105, is provided on the first side of a triangularly-shaped portion, 107. Finally, the sixth face, 106, is provided on the triangularly-shaped portion, 108, 180 degrees opposite of the fifth face, 105, on the triangularly-shaped portion 108.

Figure 2:
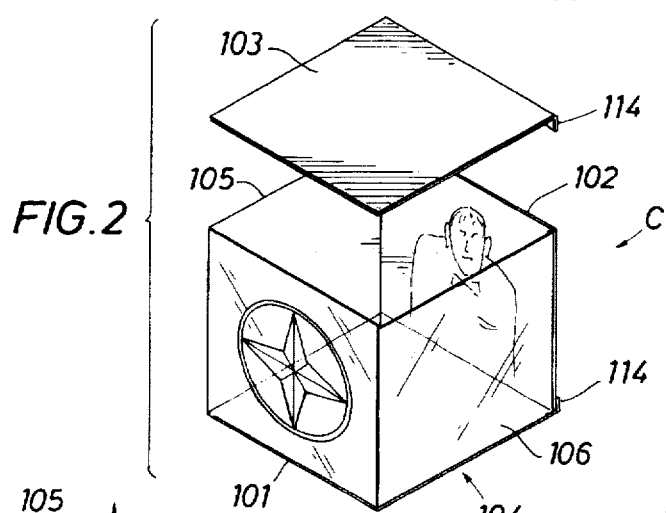
FIG. 2 is a dimensionalized view of the cubicle display device of the present invention.
Figure 3:
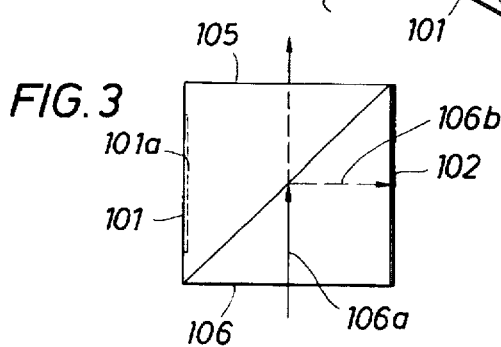
FIG. 3 is a cross-sectional view of the cube device as positioned as shown in FIG. 2 looking downward with arrows indicating the direction of the view through the device. Side one is indicated by the dashed line 101a. An image is projected onto side five 105 and images on sides five 105 and one 101 are combined when viewed through sides two 102 or six 106.
Figure 4:
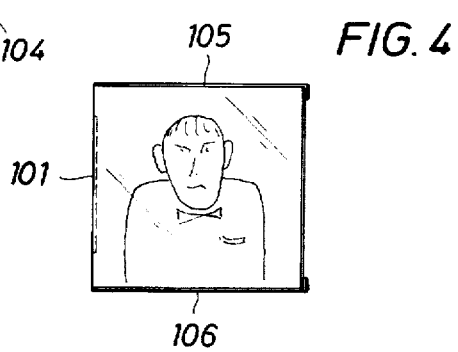
FIG. 4 is a view of the first side 101 of the device as viewed through side five 105 and observing the view on side 6 106.
Figure 5:
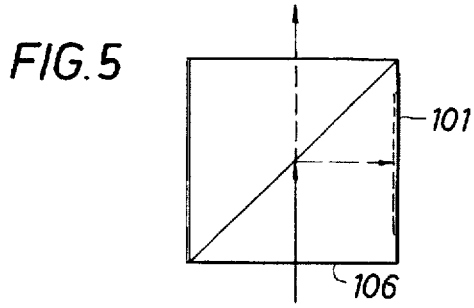
FIG. 5 is a view of the device looking through side six 106 and onto side five 105, whereby the image on side one 101 is projected onto side five.
Figure 6:
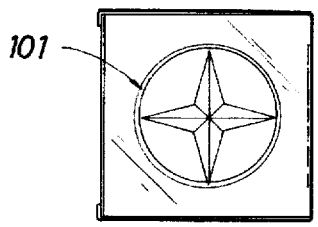
FIG. 6 is a view of the projection of the image on side one 101 onto side five 105, looking through side six 106.

As shown in FIG. 2, the third face, 103, is optically distorted or covered. The optical distortion may be provided in the form of a permanently-distorted face, such as by etching thereon to completely or partially permanently distort light passing thereacross. Alternatively, the third face, 103, may be coated or covered in a dark color, such as black or the like. Likewise, a similarly distorted fourth face, 104, is provided and is offset 180 degrees from the third face, 103.

As shown in FIG. 1, the first face, 101, is shown having an etched star in a circle permanently affixed thereon. Offset 180 degrees therefrom is a frontal image affixed on the exterior of the second face, 102, on the device 100. With reference again to FIGS. 1 and 2, the cube C of the present invention is formed from a plurality of triangularly-shaped portions, 107 and 108, which have first and second sides of the triangle, 110 and 111. The third side of each of the triangularly-shaped portions, 107 and 108, define a third side, 112, of the portions 107 and 108. The side 112 provides the longest "leg" of the triangular portions, 107 and 108, in relation to the first and second sides, 110 and 111. Each of the longer sides, 112, provide optically-deflecting surfaces 112a and 113 which are made optically-deflective by application of a metallic oxide or halogen film, 109, which may be coated or sprayed, in known manner, onto the exterior of the surfaces 112a and 113 to provide such film 109.

Alternatively, the film 19 may be provided through use of a very thin film, 109, coated on each of the two sides thereof, 109a and 109b, and thereafter sandwiched in between the triangular portions, 107 and 108, to become mated relative to the surfaces 112a and 113.

As shown in FIGS. 1 and 2, the second face 102 may have permanently or temporarily affixed thereon an image (such as the frontal view of a human, as shown), either shown across the second face 102 or secured into a frame 114, to provide a framed image of such human, or otherwise. The frame 114 may be provided by bent edges of the cover for the faces 103 and 104 such that a card or paper or the like bearing the image shown through side 102 may slip into and between the bent edge, or frame 114. It will be appreciated by those skilled in the art that the view projected onto the second face 102, whether or not in a frame, 114, may be still, or moving, such as a projected motion picture, television or cable image or other video-projecting device.

The optically-transparent material, which is intended for use in the present invention, may be a glass, plexiglass, or a crystal. The glass can be any of a number of various amorphous materials which are traditionally formed from a melt by cooling to rigidity without crystallization, such as a usually transparent or translucent material consisting optically of a mixture of silicates. The glass may be a material produced by fast cooling of magma. Additionally, the optically translucent material may be formed from an acrylic-based plastic sheet or from a molding powder, such as, for example, plexiglass.

The crystal that is contemplated for use in the formation of the present invention may be any quartz or quartz-like material that is transparent or nearly so, and that is either colorless or only slightly tinged. The crystal may also be a body that is formed by the solidification of a chemical element, a compound, or a mixture which has a regularly repeating internal arrangement of its atoms and, normally, external plane surfaces.

The thin skin or membranous covering, or film, which is incorporated in the present invention in covering the third side, 112, 113, of the triangular-shaped portions, 107, 108, may be one of many known to those skilled in the art of applying mirror imaging techniques to glass and the like, and may be a metallic oxide or metallic halogen. The oxide is a binary compound of oxygen with a more electro-positive metallic element or group.

By use of a metallic halogen, I mean to include any of the five elements of fluorine, chlorine, bromine, iodine and astatine which will form part of Group VII A of the Periodic Table and which exist in the free state, normally as a diatomic molecule.

The film of the metallic oxide/halogen is applied to the surface, either by brushing or spraying the surface of same or by use of vacuum coating techniques, to transpose each of the third and fourth sides into an optically deflecting surface, such that a beam of light is turned, or deflected, from a straight course or fixed direction and bent correspondingly to the angle of deflection provided by the angle of the surfaces 112a, 113 to one another in relation to the first, second, fifth and sixth faces.

The device of the present invention has two faces, such as the third and fourth face of the preferred embodiment shown in the drawings, which are optically distorted, or completely covered such that falsified reproduction of a light signal is caused by the change in the wave form of the original light wave such that little, if any, of the original light wave directed upon the outer surface of such face may pass through the device and onto the respective opposing or other surface of the device. This may be accomplished by etching on the respective surfaces to deflect the light waves or by completely deflecting same by painting, coating or otherwise completely covering the exterior of each of said two faces. The covering may be provided in the form of packaging for the device.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of this disclosure. Accordingly, modifications are contemplated which can be made without departing from the spirit of the described invention.

What is claimed and desired to be secured by Letters Patent is:

1. A metallic oxide or halogen coated cubicle display device, comprising:

(a) a cube having six exterior faces and formed from a pair of equal triangularly-shaped portions of initially optically transparent material selected from the class consisting of glass, plexiglass and crystal, each of said portions having first and second sides of equal length and a third side longer than either of the first or second sides;

(b) each of said portions having emplaced thereon a film of a metallic oxide or halogen material to transpose each of said third sides into an optically deflecting surface;

(c) each of the first and second of said six faces being offset from a line intersecting said third sides at about 90 degrees, whereby images projected onto the exterior of one of said first and second faces may be projected through the other of said first and second faces, each of the third and fourth faces being optically distorted to prevent any image projected onto the exterior of each of said third and fourth faces from being nondistortedly projected through the other of the third and fourth faces;

(d) one of said fifth and sixth faces having an image projected thereon that may be projected through the other of said fifth and sixth faces; and (e) the other of said fifth and sixth faces projecting an image thereon which may be projected through the other of the fifth and sixth faces and through one of the first and second faces.

2. The display device of claim 1, wherein the initially optically transparent material is a plexiglass.

3. The display device of claim 1, wherein the metallic oxide or halogen material is selected from the class consisting of chromium oxide, silver oxide, iron oxide, and a metallic halogen of one of fluorine, chlorine, bromine and iodine.

4. The display device of claim 1, wherein the image projected on one of the fifth and sixth faces is permanently affixed on said one of the fifth and sixth faces.

5. The display device of claim 1, wherein the image projected onto one of the fifth and sixth faces is a motion picture.

6. The display device of claim 1 wherein the projected image is enclosed in a frame permanently affixed to said device.

7. The display device of claim 1 wherein the projected image is enclosed in a frame selectively removable from said device.

8. The display device of claim 1 wherein the projected image is a live projection.

9. The display device of claim 1 wherein the projected image is not a live projection and is fixed.

10. The display device of claim 1 wherein the projected image is moving in real time.

11. The display device of claim 1 wherein the projected image is a motion picture.

12. The display device of claim 1 wherein the projected image is received from a television or cable projector.

13. A metallic oxide or halogen coated cubicle display device comprising:

(a) means defining a cube having six exterior faces and formed from a pair of equal triangularly-shaped portions of initially optically transparent material selected from the class consisting of glass, plexiglass and crystal, each of said portions having first and second sides of equal length and a third side longer than either of the first or second sides for deflection of an image thereacross;

(b) each of said portions having emplaced thereon means defining a film of a metallic oxide or halogen whereby each of said third sides is transposed into an optically-deflecting surface;

(c) means permitting each of the first and second of the six surfaces to be offset from a line intersecting the third side at about 90 degrees, whereby images projected onto the exterior of one of said first and second sides may be projected through the other of said first and second sides, each of said third and fourth faces having means whereby said third and fourth faces are optically distorted to prevent any image projected onto the exterior of either of said third and fourth faces from being non-distortedly projected through the other of the third and fourth faces;

(d) means co-operating with one of said fifth and sixth faces for projecting an image thereon which may also be projected through the other of the fifth and sixth faces and through one of the first and second faces; and (e) means in relation to the other of said fifth and sixth faces for projecting an image therethrough which may be projected through the other of the fifth and sixth faces, and through one of the first and second faces.

14. The display device of claim 13 wherein the initially optically transparent material is a plexiglass.

15. The display device of claim 13 wherein the metallic oxide or halogen is selected from the class consisting of chromium oxide, silver oxide, iron oxide and a metallic halogen.

16. The display device of claim 13 wherein the image projected onto one of the fifth and sixth faces is permanently affixed on said one of the fifth and sixth faces.

17. The display device of claim 13 wherein the image projected onto one of the fifth and sixth faces is a motion picture.

18. The display device of claim 13 wherein the projected image is enclosed in a frame permanently affixed to said device.

19. The display device of claim 13 wherein the projected image is enclosed in a frame selectively removable from said device.

* * * * *